Sept. 30, 1924.  E. H. BALDWIN  1,510,030

COOKING PLATE

Filed March 17, 1924

INVENTOR.
Edmond H. Baldwin
BY M. C. Frank
ATTORNEY

Patented Sept. 30, 1924.

1,510,030

UNITED STATES PATENT OFFICE.

EDMOND H. BALDWIN, OF ALAMEDA, CALIFORNIA.

COOKING PLATE.

Application filed March 17, 1924. Serial No. 699,806.

*To all whom it may concern:*

Be it known that I, EDMOND H. BALDWIN, a citizen of the United States, and a resident of Alameda, in the county of Alameda and State of California, have invented certain new and useful Improvements in Cooking Plates, of which the following is a specification.

My invention relates to a cooking or gas plate, which is especially adapted for use on stoves and appliances where the cooking vessel usually comes in direct contact with the flame.

The primary object of my invention, is to provide a simple and cheap device which may be bought on the market and used to good advantage on any kind of conventional type of stove, but more likely on gas stoves, for saving fuel, preventing the burning of cooking utensil handles, preventing the discoloration of utensils, preventing the burning of food in the utensil, preventing the burning of the hands when manipulating utensils over the flame, and otherwise making it more convenient to cook.

The many advantages of the device, will appear as the description of it proceeds with reference to the illustrative embodiment of the device shown in the accompanying drawing.

Figure 1:
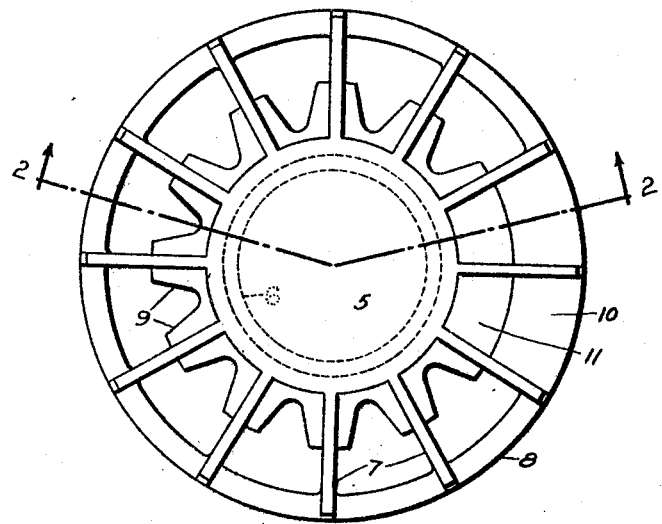
Figure 2:
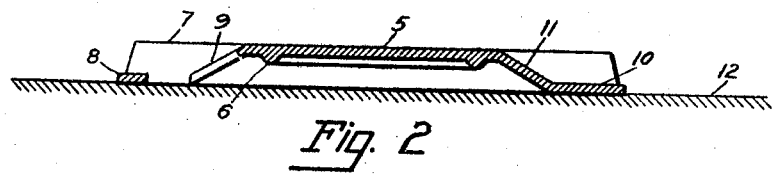

In said drawing, Figure 1 is a plan of the device, and Fig. 2 is a cross-section of it on the line 2—2 of Fig. 1.

Figure 3:
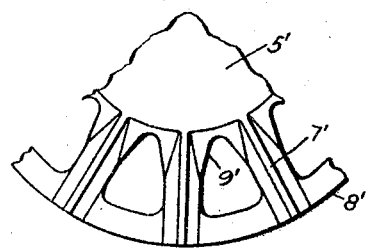
Figure 4:
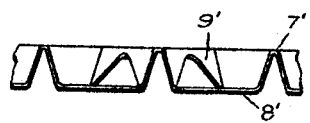

Fig. 3 is a plan of a portion of the device as stamped from sheet metal, and Fig. 4 is an edge view of it.

Referring to the drawing in detail, I will first describe the form shown in Figs. 1 and 2 which is the cast embodiment of the invention. In this form I propose to cast the device in the shape of an inverted plate, and having a diameter sufficient to cover the area about an ordinary burner.

The plate is made with a central area 5, preferably flat on the top and bottom with the exception of the reinforcing bead 6 on the bottom. Extending outwardly from the center 5 are ribs 7 which terminate at the outer ring 8. This ring provides a supporting surface for the plate. The ribs 7 raise the center above the stove surface directly over the flame, and since their top surfaces are in the same horizontal plane as that of the center 5, they increase the utensil supporting area of the plate. The idea being to support the cooking vessel out of direct contact with the flame, and yet leave a flame-spreading area under the plate.

The spaces between the ribs 7 are open, except where the web extensions 9 from the center 5 project into the spaces. These web extensions are projected downwardly and may terminate with their edges resting upon the stove surface 12 as shown in Fig. 2.

One of the most important features of the invention is the provision for protecting cooking utensil handles from heat, to which end I have elected to block off the openings between the ribs on one side of the plate. This may be accomplished by increasing the width of the ring 8 as at 10 and leaving the V-shaped part of the web extension solid as at 11. This construction will leave a solid area so that should the flame be high enough to lap around the web extensions, it will not heat the handle of a utensil.

As previously stated, the above described form may be easily cast at a minimum cost so that the plate may be sold at a reasonable price.

In the stamped form shown in Figs. 3 and 4 the cost price will be less, but otherwise it will offer the same advantages as in the cast form. In this form the ribs 7' will be formed as an inverted V, while the ring 8' and the webs 9' and center 5' will be practically the same as in the cast form. The stamped form will also include the handle protecting solid area as in the cast form.

From the above it will be seen that I have devised a novel and useful appliance, that will serve its intended purpose to the best advantage without a costly expenditure either in production or when sold to the user.

What I claim as new and desire to secure by Letters Patent of the United States is the following:

A cooking plate, comprising a ring, a center, ribs connecting the ring and center, and spaces between the ribs; some of said spaces being open, and other of said spaces being closed for a protective area for utensil handles; the said center being raised above the ring and provided with web extensions projecting into the spaces between the ribs to form a flame-spreader.

In testimony whereof I affix my signature.

EDMOND H. BALDWIN.